US008725397B2

(12) United States Patent
Hayashida et al.

(10) Patent No.: US 8,725,397 B2
(45) Date of Patent: May 13, 2014

(54) TRAFFIC SIGNAL CYCLE ESTIMATION DEVICE AND TRAFFIC SIGNAL CYCLE ESTIMATION METHOD

(75) Inventors: Teruhide Hayashida, Shinagawa-ku (JP); Hiroki Nakashima, Kawasaki (JP); Meilan Jiang, Nagoya (JP); Masatsugu Kudara, Anjo (JP); Hiroshi Okude, Toyota (JP); Youta Suzuki, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/499,997

(22) PCT Filed: Jun. 17, 2010

(86) PCT No.: PCT/JP2010/060302
§ 371 (c)(1), (2), (4) Date: Apr. 3, 2012

(87) PCT Pub. No.: WO2011/158364
PCT Pub. Date: Dec. 22, 2011

(65) Prior Publication Data
US 2013/0103291 A1 Apr. 25, 2013

(51) Int. Cl.
*G06F 19/00* (2011.01)
*G06G 7/70* (2006.01)
*G06G 7/76* (2006.01)
*G06G 1/00* (2006.01)

(52) U.S. Cl.
USPC .......... 701/117; 701/118

(58) Field of Classification Search
CPC .......... G08G 1/0125
USPC .......... 701/117, 118
See application file for complete search history.

(56) References Cited

U.S. PATENT DOCUMENTS 3,503,040 A * 3/1970 Hendricks .......... 340/910
3,508,192 A * 4/1970 Vivier et al. .......... 340/918
3,613,073 A * 10/1971 Clift .......... 340/920

(Continued)

FOREIGN PATENT DOCUMENTS

CN 1959759 A 5/2007
CN 101702262 A 5/2010

(Continued)

OTHER PUBLICATIONS

International Search Report for PCT/JP2010/060302 dated Sep. 21, 2010.

*Primary Examiner* — Fadey Jabr
*Assistant Examiner* — Paula A Schneider
(74) *Attorney, Agent, or Firm* — Sughrue Mion, PLLC

(57) ABSTRACT

A traffic signal cycle estimation device 2 is provided, which includes a travel time acquisition unit 4 acquiring a traffic signal section travel time, a frequency distribution calculation unit 5 calculating a frequency distribution of the traffic signal section travel times on the basis of the traffic signal section travel times, a travel time group determination unit 6 determining a first travel time group in which the vehicle does not stop at the traffic signal and a second travel time group in which the vehicle stops at the traffic signal on the basis of the frequency distribution of the traffic signal section travel times, and a traffic signal cycle estimation unit 7 estimating cycle information of the traffic signal on the basis of a difference between the first travel time group and the second travel time group.

8 Claims, 8 Drawing Sheets

(56) References Cited

U.S. PATENT DOCUMENTS

| | | | | | |
|---|---|---|---|---|---|
| 5,444,442 | A * | 8/1995 | Sadakata et al. | .............. | 340/916 |
| 6,985,090 | B2 * | 1/2006 | Ebner et al. | .................... | 340/907 |
| 8,035,530 | B2 * | 10/2011 | Ramasubbu | .................. | 340/922 |
| 2003/0063015 | A1 * | 4/2003 | Ebner et al. | .................... | 340/907 |
| 2009/0231160 | A1 * | 9/2009 | Ramasubbu | .................. | 340/917 |
| 2010/0063715 | A1 * | 3/2010 | Wynter et al. | ................. | 701/118 |

FOREIGN PATENT DOCUMENTS

| | | | |
|---|---|---|---|
| JP | 2005-182219 | A | 7/2005 |
| JP | 2005-267472 | A | 9/2005 |
| JP | 2008-191909 | A | 8/2008 |
| JP | 2009-075709 | A | 4/2009 |
| JP | 2009-116508 | A | 5/2009 |
| JP | 2009-217729 | A | 9/2009 |

* cited by examiner

TRAFFIC SIGNAL CYCLE ESTIMATION DEVICE AND TRAFFIC SIGNAL CYCLE ESTIMATION METHOD

CROSS REFERENCE TO RELATED APPLICATIONS

This application is a National Stage of International Application No. PCT/JP2010/060302 filed Jun. 17, 2010, the contents of which are incorporated herein by reference in their entirety.

TECHNICAL FIELD

The present invention relates to a traffic signal cycle estimation device and a traffic signal cycle estimation method which estimates cycle information of a traffic signal.

BACKGROUND ART

As a device for estimating information on a traffic signal in the related art, for example, Japanese Unexamined Patent Application Publication No. 2009-116508 discloses a traffic signal information estimation device which estimates the time when the traffic signal is switched to a green signal on the basis of a start time of a probe vehicle when the probe vehicle stops just before the traffic signal of an intersection. This traffic signal information estimation device calculates start delay time taken from the start of the lead vehicle of a vehicle array which stops at the intersection up to the start of the probe vehicle using a distance between the intersection and the probe vehicle, and accurately estimates the time when the traffic signal is switched to a green signal using the start delay time and the start time.

CITATION LIST

Patent Literature

Patent literature 1: Japanese Unexamined Patent Application Publication No. 2009-116508

SUMMARY OF INVENTION

Technical Problem

However, in the traffic signal information estimation device in the related art as described above, collection of special data such as the start time of a probe vehicle is required, and thus a probe vehicle on which a device for collecting the special data is mounted is necessary. For this reason, in the traffic signal information estimation device in the related art, it is not easy to collect necessary data and it is difficult to estimate the traffic signal information efficiently.

Therefore, it is an object of the present invention is to provide a traffic signal cycle estimation device and a traffic signal cycle estimation method which can efficiently estimate cycle information of a traffic signal through estimation of the cycle information of the traffic signal on the basis of a first travel time group in which a vehicle does not stop at the traffic signal and a second travel time group in which a vehicle stops at the traffic signal.

Solution to Problem

According to an aspect of the invention, a traffic signal cycle estimation device related to the present invention may include a travel time acquisition unit acquiring a traffic signal section travel time that is a time taken from the entrance of a vehicle into a predetermined traffic signal section that corresponds to a traffic signal until the vehicle passes through the traffic signal section; a frequency distribution calculation unit calculating a frequency distribution of the traffic signal section travel times acquired by the travel time acquisition unit; a travel time group determination unit determining a first travel time group in which the vehicle does not stop at the traffic signal and a second travel time group in which the vehicle stops at the traffic signal on the basis of the frequency distribution of the traffic signal section travel times calculated by the frequency distribution calculation unit; and a traffic signal cycle estimation unit estimating cycle information of the traffic signal on the basis of a difference between the first travel time group and the second travel time group.

According to the traffic signal cycle estimation device related to the invention, since the cycle information of the traffic signal is estimated on the basis of the difference between the first travel time group in which the vehicle does not stop at the traffic signal and the second travel time group in which the vehicle stops at the traffic signal, estimation of the cycle information such as a red signal time can be realized from the traffic signal section travel time which is obtained through analysis of the travel time that is generally collected from the vehicle. Accordingly, according to this traffic signal cycle estimation device, necessary data can be easily collected in comparison to the use of a vehicle for collecting special data in order to estimate the cycle information of the traffic signal, and thus the cycle information of the traffic signal can be efficiently estimated.

In the traffic signal cycle estimation device related to the invention, it is preferable that the traffic signal cycle estimation unit estimate the red signal time of the traffic signal on the basis of the difference between the first travel time group and the second travel time group.

According to the traffic signal cycle estimation device related to the invention, it is considered that the sum of the red signal time of the traffic signal and a predetermined yellow signal time appears in the difference between the first travel time group and the second travel time group, and the red signal time of the traffic signal can be estimated on the basis of the first travel time group and the second travel time group.

In the traffic signal cycle estimation device related to the invention, it is preferable that the traffic signal cycle estimation unit estimate the red signal time of the traffic signal on the basis of a difference between a peak value of the first travel time group and a peak value of the second travel time group.

According to the traffic signal cycle estimation device related to the invention, it is considered that the sum of the red signal time of the traffic signal and a predetermined yellow signal time appears most readily in the difference between the peak value of the first travel time group and the peak value of the second travel time group, and the estimation of the red signal time having high reliability can be realized on the basis of the difference between such peak values.

In the traffic signal cycle estimation device related to the invention, it is preferable that the traffic signal cycle estimation unit estimate green signal times of plural traffic signals that are installed on the same intersection on the basis of red signal times that are respectively estimated with respect to the plural traffic signals.

According to the traffic signal cycle estimation device related to the invention, the plural traffic signals that are installed at the same intersection interlock with one another on the basis of a predetermined rule, and the green signal times of the respective traffic signals can be estimated on the basis of the red signal times that are estimated with respect to the traffic signals.

A traffic signal cycle estimation method related to the present invention may include a travel time acquisition step of acquiring a traffic signal section travel time that is a time taken from the entrance of a vehicle into a predetermined traffic signal section that corresponds to a traffic signal until the vehicle passes through the traffic signal section; a frequency distribution calculation step of calculating a frequency distribution of the traffic signal section travel times acquired in the travel time acquisition step; a travel time group determination step of determining a first travel time group in which the vehicle does not stop at the traffic signal and a second travel time group in which the vehicle stops at the traffic signal on the basis of the frequency distribution of the traffic signal section travel times calculated in the frequency distribution calculation step; and a traffic signal cycle estimation step of estimating cycle information of the traffic signal on the basis of a difference between the first travel time group and the second travel time group.

According to the traffic signal cycle estimation method related to the invention, since the vehicle estimates the cycle information of the traffic signal on the basis of the first travel time group in which the vehicle does not stop at the traffic signal and the second travel time group in which the vehicle stops at the traffic signal, estimation of the cycle information can be realized from the traffic signal section travel time which is obtained through analysis of the travel time that is generally collected from the vehicle. Accordingly, according to this traffic signal cycle estimation method, necessary data can be easily collected in comparison to the use of a vehicle for collecting special data in order to estimate the cycle information of the traffic signal, and thus the cycle information of the traffic signal can be efficiently estimated.

In the traffic signal cycle estimation method related to the invention, it is preferable that the traffic signal cycle estimation step estimate the red signal time of the traffic signal on the basis of the difference between the first travel time group and the second travel time group.

According to the traffic signal cycle estimation method related to the invention, it is considered that the sum of the red signal time of the traffic signal and a predetermined yellow signal time appears in the difference between the first travel time group and the second travel time group, and the red signal time of the traffic signal can be estimated on the basis of the difference between the first travel time group and the second travel time group.

In the traffic signal cycle estimation method related to the invention, it is preferable that the traffic signal cycle estimation step estimate the red signal time of the traffic signal on the basis of a difference between a peak value of the first travel time group and a peak value of the second travel time group.

According to the traffic signal cycle estimation method related to the invention, it is considered that the sum of the red signal time of the traffic signal and a predetermined yellow signal time appears most readily in the difference between the peak value of the first travel time group and the peak value of the second travel time group, and the estimation of the red signal time having high reliability can be realized on the basis of the difference between such peak values.

In the traffic signal cycle estimation method related to the invention, it is preferable that the traffic signal cycle estimation step estimate green signal times of plural traffic signals that are installed on the same intersection on the basis of red signal times that are respectively estimated with respect to the plural traffic signals.

According to the traffic signal cycle estimation method related to the invention, the plural traffic signals that are installed on the same intersection interlock with one another on the basis of a predetermined rule, and the green signal times of the respective traffic signals can be estimated on the basis of the red signal times that are estimated with respect to the traffic signals.

Advantageous Effects of Invention

According to the present invention, the cycle information of the traffic signal can be efficiently estimated.

DESCRIPTION OF EMBODIMENTS

Figure 1:
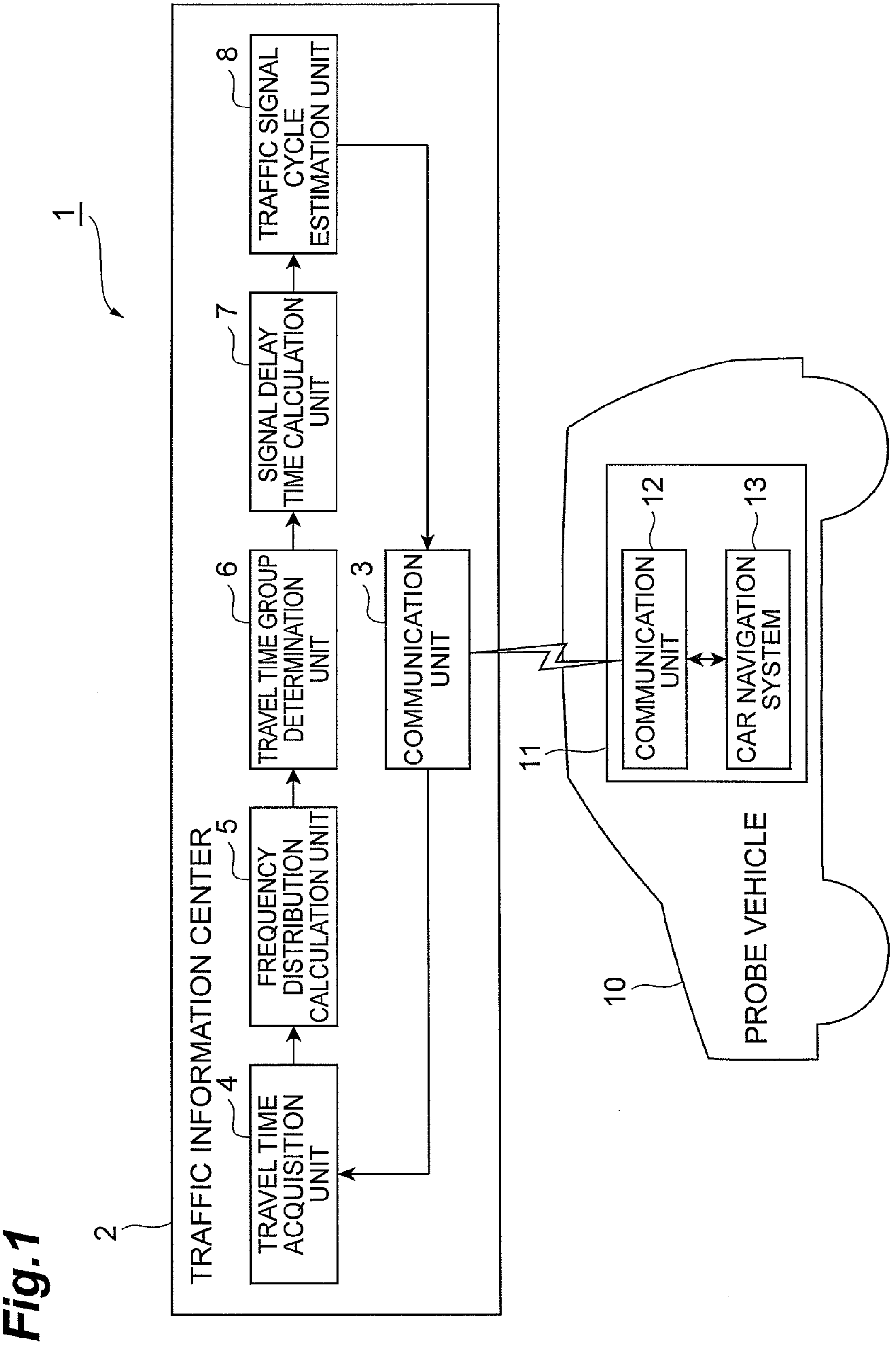
FIG. 1 is a diagram illustrating the configuration of a traffic signal cycle estimation device according to an embodiment of the present invention.

Hereinafter, a preferred embodiment of the invention will be described with reference to the accompanying drawings. Further, the same reference numerals are given to the same or substantial portions in various figures, and duplicate explanation thereof will be omitted.

A traffic signal cycle estimation system 1 related to this embodiment, as illustrated in FIG. 1, estimates cycle information of a traffic signal such as a red signal time in a manner that a traffic signal cycle estimation device 2 that is installed in a traffic information center analyzes travel time data which are collected from a vehicle 10 that is a probe vehicle. The travel time data includes position data of the vehicle 10 per unit time.

The traffic signal cycle estimation system 1 acquires a traffic signal section travel time that is a time taken from the entrance of a vehicle into a predetermined traffic signal section that corresponds to a traffic signal until the vehicle passes through the traffic signal section by analyzing the travel time data that are collected from the vehicle 10. The traffic signal section is a section that is preset on a road to correspond to each traffic signal. The traffic signal cycle estimation system 1 calculates a frequency distribution of the traffic signal section travel times of a certain traffic signal on the basis of the traffic signal section travel times of plural vehicles 10. The traffic signal cycle estimation system 1 determines a first travel time group in which the vehicle does not stop at the traffic signal and a second travel time group in which the vehicle stops at the traffic signal on the basis of the frequency distribution of the traffic signal section travel times. The traffic signal cycle estimation system 1 estimates cycle information of the traffic signal on the basis of the first travel time group and the second travel time group.

Figure 2:
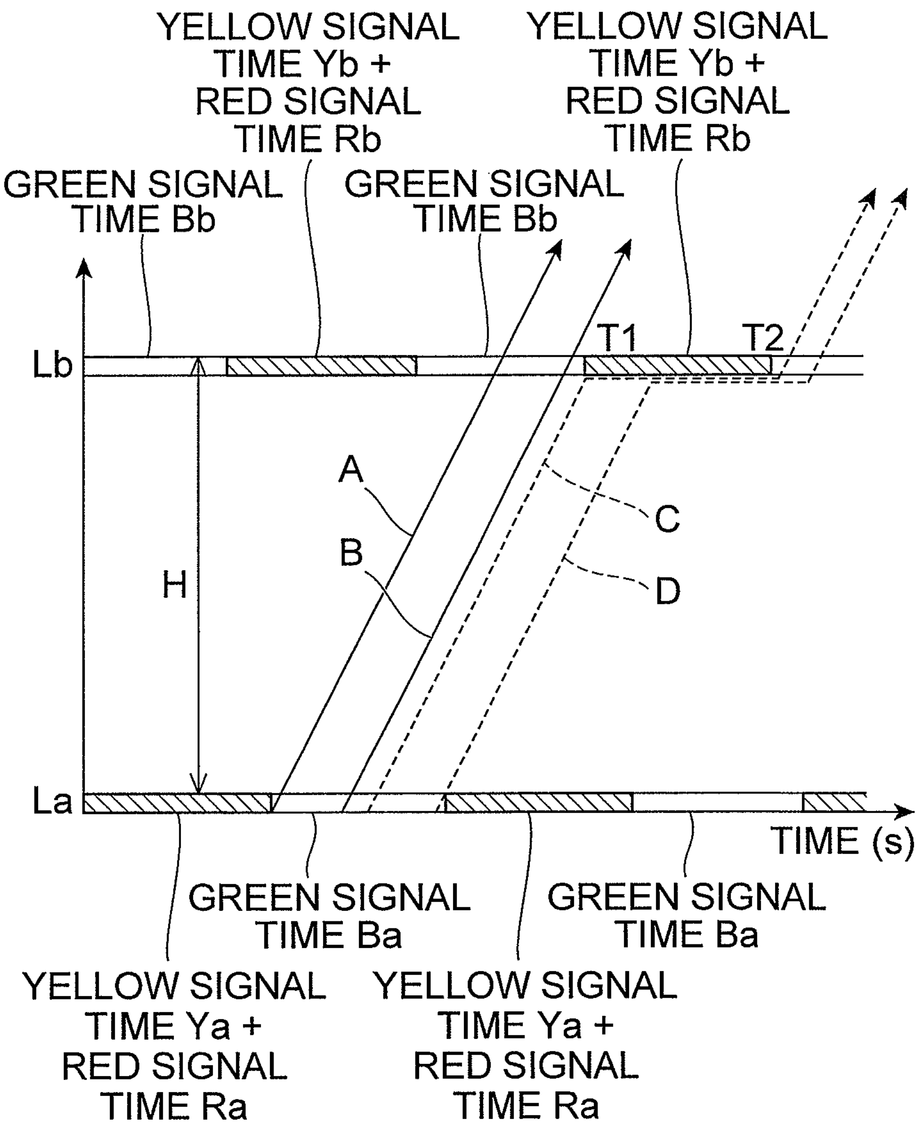
FIG. 2 is a diagram explaining traffic signal section travel times.

Here, FIG. 2 is a diagram illustrating travel time data of four vehicles A to D. The vehicles A to D travel on the same lane between two traffic signals La and Lb. In FIG. 2, the horizontal axis represents time, and the vertical axis represents a position of a vehicle. The vehicles A to D travel at a constant speed V except for a case where they stop in front of the traffic signal. In FIG. 2, H denotes the length of the traffic signal section N that corresponds to the traffic signal Lb on the downstream side of the two traffic signals La and Lb. Specifically, the traffic signal section N is set to a section from a point immediately after passing the traffic signal La on the upstream side to a point immediately after passing the traffic signal Lb on the downstream side.

In FIG. 2, a green signal time of the traffic signal La on the upstream side is denoted by Ba, a red signal time is denoted by Ra, and a yellow signal time is denoted by Ya. In the same manner, the green signal time of the traffic signal Lb on the downstream side is denoted by Bb, the red signal time is denoted by Rb, and the yellow signal time is denoted by Yb. Here, if it is assumed that the time when the traffic signal Lb is switched from the green signal time Bb to the yellow signal time Yb is T1, and the time when the traffic signal Lb is switched from the red signal time Rb to the green signal time Bb is T2, the sum of the yellow signal time Yb and the red signal time Rb is represented as a difference between T2 and T1.

The vehicles A to D pass the traffic signal La at the same green signal time Ba and enter the traffic signal section N. Thereafter, the vehicle A and the vehicle B pass through the traffic signal Lb at the green signal time Bb, and pass the traffic signal section N. On the other hand, the vehicle C and the vehicle D stop in front of the traffic signal Lb which is switched from the green signal time Bb to the yellow signal time Yb and the red signal time Rb. The vehicle C and the vehicle D pass through the traffic signal Lb and pass the traffic signal section N after the traffic signal Lb is switched to the green signal time Bb again.

Figure 3:
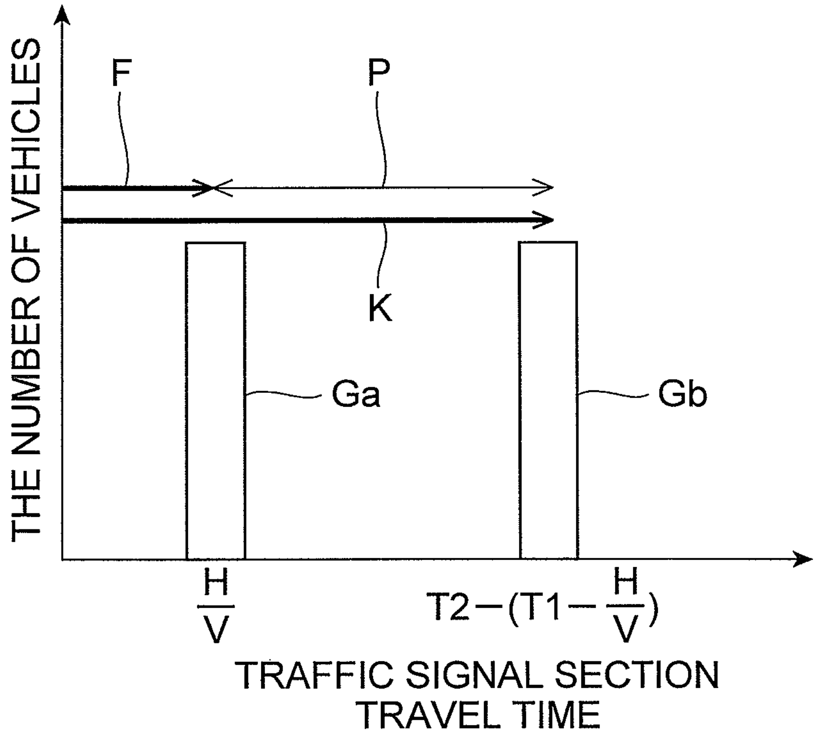
FIG. 3 is a graph illustrating a frequency distribution of traffic signal section travel times.

FIG. 3 shows a graph illustrating a frequency distribution of traffic signal section travel times in the case of FIG. 2. In FIG. 3, the horizontal axis represents the traffic signal section travel time, and the vertical axis represents the number of vehicles. In FIG. 3, a group of the traffic signal section travel times of the vehicle A and the vehicle B which do not stop at the traffic signal Lb becomes a first travel time group Ga. Further, the traffic signal section travel time of the first travel time group Ga becomes a free flow travel time F. In the same manner, a group of the traffic signal section travel times of the vehicle C and the vehicle D which stop at the traffic signal Lb becomes a second travel time group Gb. Further, the traffic signal section travel time of the second travel time group Gb becomes a traffic signal stop travel time K.

In this case, the free flow travel time F of the first travel time group Ga corresponds to a value that is obtained by dividing the length H of the traffic signal section N by the speed V. On the other hand, the traffic signal stop travel time K of the second travel time group Gb almost corresponds to a time that is obtained by adding a difference between T2 and T1, that is, the sum of the yellow signal time Yb and the red signal time Rb, to the free flow travel time F of the first travel time group Ga. The difference between the traffic signal stop travel time K and the free flow travel time F becomes a signal delay time P. This signal delay time P becomes the length of the time that corresponds to the sum of the yellow signal time Yb and the red signal time Rb of the traffic signal Lb.

Figure 4:
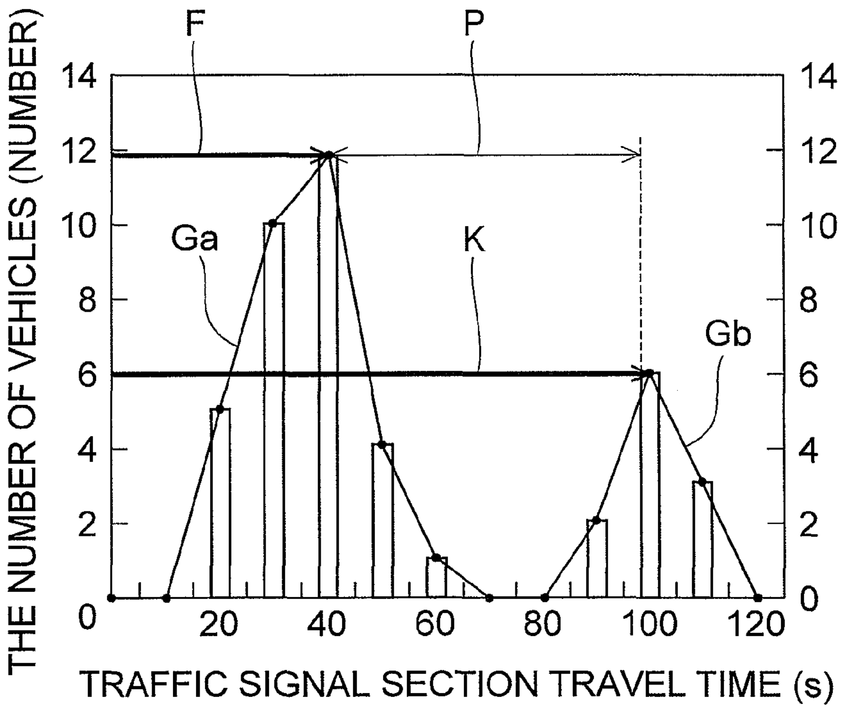
FIG. 4 is a graph illustrating a frequency distribution of traffic signal section travel times of plural probe vehicles.

FIG. 4 is a graph illustrating a frequency distribution of traffic signal section travel times calculated from the travel time data of plural vehicles with respect to a certain traffic signal. In FIG. 4, the frequency of the traffic signal section travel times is summarized in the unit of 10 seconds. In the case of calculating the frequency distribution of the traffic signal section travel times on the basis of the travel time data of plural vehicles, variation occurs in the frequency distribution due to the differences of vehicle traveling situations. In FIG. 4, the first travel time group Ga and the second travel time group Gb are shown as mountain-shaped graphs.

In this case, considering that a peak value that is the traffic signal section travel time in which the largest number of vehicles are present in the first travel time group Ga is the traffic signal section travel time of a standard vehicle, the peak value is adopted as the free flow travel time F. In the same manner, the peak value in the second travel time group Gb is adopted as the traffic signal stop travel time K. As described above, by adopting the traffic signal stop travel time K and the free flow travel time F, it becomes possible to request the signal delay time P of the standard vehicle as the difference between the traffic signal stop travel time K and the free flow travel time F.

Figure 5:
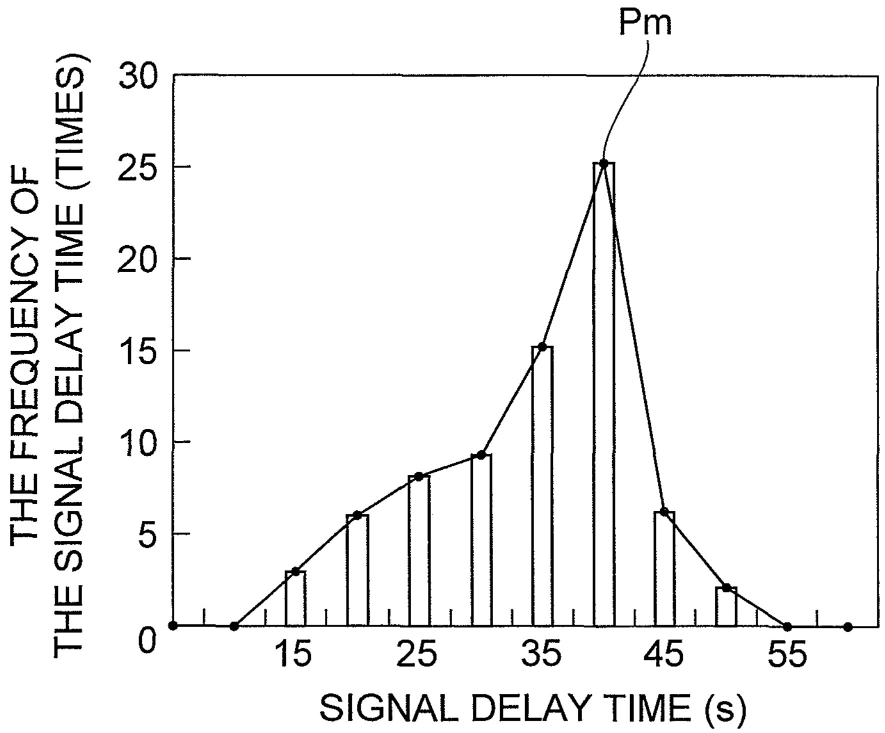
FIG. 5 is a graph illustrating a frequency distribution of signal delay times.

FIG. 5 is a graph illustrating a frequency distribution of the signal delay times P. In FIG. 5, the calculation of the signal delay times P that is performed on the basis of the travel time data that are collected in a predetermined unit time is counted as one calculation. In FIG. 5, the frequency distribution of the signal delay times P is roughly shown as a mountain-shaped graph. Among the frequency distribution of the signal delay times P, the signal delay time P having the highest frequency is shown as the maximum signal delay time Pm. The maximum signal delay time Pm is a signal delay time P that appears with the highest frequency with respect to the traffic signal section corresponding to a certain traffic signal. The maximum signal delay time Pm becomes the length of time that corresponds to the sum of the yellow signal time and the red signal time.

The traffic signal cycle estimation system 1 related to this embodiment estimates the sum of the yellow signal time and the red signal time of the traffic signal on the basis of the maximum signal delay time Pm that corresponds to the sum of the yellow signal time and the red signal time of the traffic signal. Further, considering it is often that the yellow signal time is constant, not by the traffic signal, the traffic signal cycle estimation system 1 estimates the red signal time of the traffic signal by assuming that the yellow signal time is constant.

Further, considering that the plural traffic signals installed at the same intersection interlock with one another on the basis of a predetermined rule, the traffic signal cycle estimation system 1 estimates the green signal times of the respective traffic signals on the basis of the red signal times estimated with respect to the traffic signals installed at the same intersection. The traffic signal cycle estimation system 1 estimates the cycle time of the traffic signal on the basis of the estimated green signal time, yellow signal time, and red signal time.

Hereinafter, the configuration of the traffic signal cycle estimation system 1 will be described.

As illustrated in FIG. 1, the traffic signal cycle estimation system 1 related to this embodiment includes a traffic signal cycle estimation device 2 installed in a traffic information center, and an in-vehicle device 11 mounted on the vehicle 10.

The in-vehicle device 11 is provided with a communication unit 12 and a car navigation system 13. The communication system 12 performs wireless communication with the traffic information center through a base station or the like that configures a wireless communication network.

The car navigation system 13 is a system that performs detection of the position or traveling direction of a vehicle and path guidance to the destination. The car navigation system 13 has a GPS (Global Positioning System) function that performs position detection of the vehicle 10 and a timer function that acquires the current time. The car navigation system 13 generates position data of the detected vehicle 10 and travel time data from the detection time of the position data. The travel time data generated by the car navigation system 13 is transmitted to the traffic signal cycle estimation device 2 of the traffic information center through the communication unit 12.

The traffic signal cycle estimation device 2 includes a communication unit 3, a travel time acquisition unit 4, and a frequency distribution calculation unit 5. Further, the traffic signal cycle estimation device 2 includes a travel time group determination unit 6, a traffic signal delay time calculation unit 7, and a traffic signal cycle estimation unit 8. The communication unit 3 performs wireless communication with the communication unit 12 of the vehicle 10 through the base station or the like that configures the wireless communication network.

The travel time acquisition unit 4 acquires the traffic signal section travel time that is a time taken from the entrance of the vehicle 10 into a predetermined traffic signal section until the vehicle passes through the traffic signal section by analyzing the travel time data transmitted from the vehicle 10 through the communication unit 3 (see FIG. 2). Further, the traffic signal section is set so that a vehicle that travels in a predetermined direction within the corresponding traffic signal section faces only one traffic signal. In the case where one traffic signal performs signal display with respect to plural directions, different traffic signal sections are set in the respective directions. The travel time acquisition unit 4 prestores information on the traffic signal sections in association with road map data. The travel time acquisition unit 4 acquires the traffic signal section travel time for each traffic signal on the basis of the travel time data transmitted from the vehicle 10. The travel time acquisition unit 4 functions as a travel time acquisition unit described in the claim.

The frequency distribution calculation unit 5 calculates the frequency distribution of the traffic signal section travel times on the basis of the traffic signal section travel times of the plural vehicles acquired by the travel time acquisition unit 4 (see FIG. 3 and FIG. 4). The frequency distribution calculation unit 5 functions as a frequency distribution calculation unit described in the claim.

The travel time group determination unit 6 determines the first travel time group Ga in which the vehicle does not stop at the traffic signal and the second travel time group Gb in which the vehicle stops at the traffic signal on the basis of the frequency distribution calculated by the frequency distribution calculation unit 5 (see FIG. 4). Specifically, the travel time group determination unit 6 recognizes two groups having different traffic signal section travel times from the frequency distribution calculated by the frequency distribution calculation unit 5 using the known information processing technology. The travel time group determination unit 6 recognizes the group having a shorter traffic signal section travel time of the two groups as the first travel time group Ga. The travel time group determination unit 6 recognizes the group having a longer traffic signal section travel time of the two groups as the second travel time group Gb. The travel time group determination unit 6 functions as a travel time group determination unit described in the claim.

The traffic signal delay time calculation unit 7 calculates the free flow travel time F that is the peak value of the first travel time group Ga determined by the travel time group determination unit 6. Further, the traffic signal delay time calculation unit 7 calculates the traffic signal stop travel time K that is the peak value of the second travel time group Gb. The traffic signal delay time calculation unit 7 calculates the traffic signal delay time P that is the difference between the traffic signal stop travel time K and the free flow travel time F (see FIG. 3 and FIG. 4).

Further, the traffic signal delay time calculation unit 7 calculates the frequency distribution of the signal delay time P calculated for each predetermined unit time in the same traffic signal section (see FIG. 5). The traffic signal delay time calculation unit 7 calculates the maximum signal delay time Pm that is the signal delay time P having the highest frequency on the basis of the frequency distribution of the signal delay time P.

The traffic signal cycle estimation unit 8 estimates the sum of the yellow signal time and the red signal time of the traffic signal using the maximum signal delay time Pm, considering that the maximum signal delay time Pm calculated by the traffic signal delay time calculation unit 7 is a value that corresponds to the sum of the yellow signal time and the red signal time of the traffic signal. Further, the traffic signal cycle estimation unit 8 estimates the red signal time of the traffic signal on the assumption that the yellow signal time is a predetermined value.

Further, considering that the plural traffic signals installed at the same intersection interlock with one another on the basis of a predetermined rule, the traffic signal cycle estimation unit 8 estimates the green signal times of the respective traffic signals using the red signal times estimated with respect to the respective traffic signals installed at the same intersection. The traffic signal cycle estimation unit 8 estimates the cycle time of the traffic signal on the basis of the estimated green signal time, yellow signal time, and red signal time. The traffic signal cycle estimation unit 8 functions as a traffic signal cycle estimation unit described in the claim.

Next, a traffic signal cycle estimation method in the above-described traffic signal cycle estimation system 1 will be described with reference to the drawings.

Figure 6:
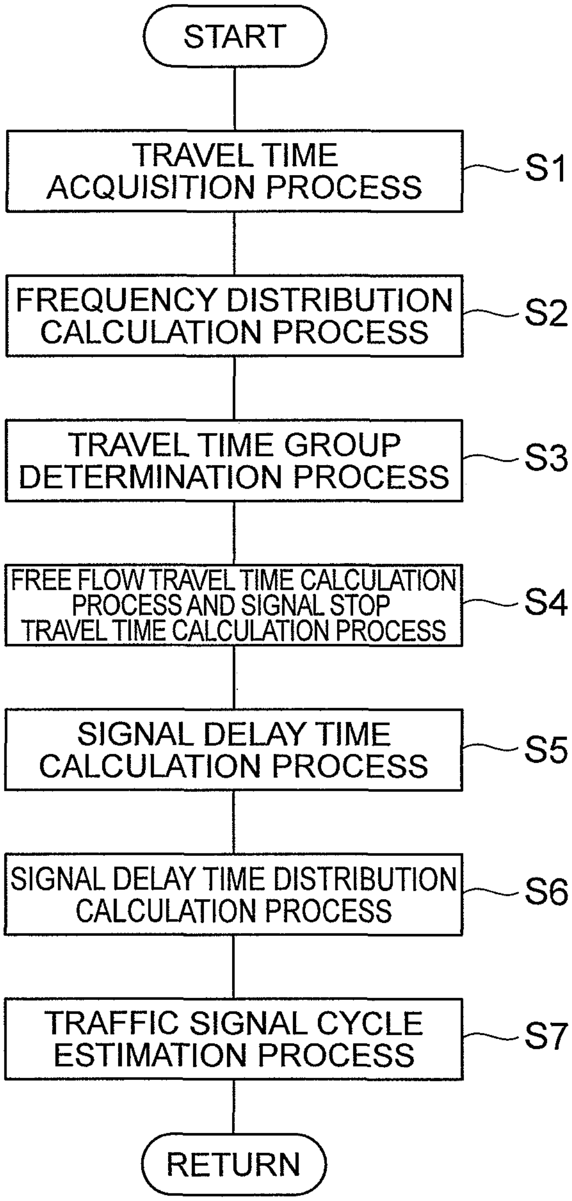
FIG. 6 is flowchart illustrating a processing flow of a traffic signal cycle estimation device.

As illustrated in FIG. 6, the travel time acquisition unit 4 of the traffic signal cycle estimation system 1 performs a travel time acquisition process of acquiring the traffic signal section travel time in a predetermined traffic signal section by first analyzing the travel time data collected through transmission from the vehicle 10 that is the probe vehicle (S1).

Next, the frequency distribution calculation unit 5 performs the frequency distribution calculation process of calculating the frequency distribution of the traffic signal section travel times on the basis of the traffic signal section travel times of the plural vehicles acquired by the travel time acquisition unit 4 (S2). Thereafter, the travel time group determination unit 6 performs the travel time group determination process of determining the first travel time group Ga in which the vehicle does not stop at the traffic signal and the second travel time group Gb in which the vehicle stops at the traffic signal on the basis of the frequency distribution calculated by the frequency distribution calculation unit 5 (S3).

In S4, the traffic signal delay time calculation unit 7 performs the free flow travel time calculation process of calculating the free flow travel time F that is the peak value of the first travel time group Ga determined by the travel time group determination unit 6. Further, the traffic signal delay time calculation unit 7 performs the traffic signal stop travel time calculation process of calculating the traffic signal stop travel time K that is the peak value of the second travel time group Gb.

Then, the traffic signal delay time calculation unit 7 performs the traffic signal delay time calculation process of calculating the traffic signal delay time P that is the difference between the traffic signal stop travel time K and the free flow travel time F (S5). Thereafter, the traffic signal delay time calculation unit 7 performs the signal delay time distribution calculation process of calculating the frequency distribution of the traffic signal delay time P on the basis of the calculated traffic signal delay time P. Thereafter, the traffic signal cycle estimation unit 8 performs the traffic signal cycle information estimation process of estimating the cycle information of the traffic signal on the basis of the maximum traffic signal delay time Pm having the highest frequency among the frequency distributions of the traffic signal delay time P (S7).

In the traffic signal cycle information estimation process in S7, the traffic signal cycle estimation unit 8 performs the summed time estimation process of estimating the sum of the yellow signal time and the red signal time of the traffic signal on the basis of the maximum signal delay time Pm. Next, the traffic signal cycle estimation unit 8 performs the red signal time estimation process of estimating the red signal time of the traffic signal on the assumption that the yellow signal time is a predetermined value.

Then, the traffic signal cycle estimation unit 8 performs the green signal time estimation process of estimating the green signal times of the respective traffic signals using the red signal times estimated with respect to the respective traffic signals installed at the same intersection. The traffic signal cycle estimation unit 8 performs the cycle time estimation process of estimating the cycle time of the traffic signal on the basis of the estimated green signal time, yellow signal time, and red signal time.

Hereinafter, the green signal time estimation process and the cycle time estimation process which are performed by the traffic signal cycle estimation unit 8 will be described as an example of four traffic signals arrange at a crossroad intersection illustrated in FIG. 7.

Figure 7:
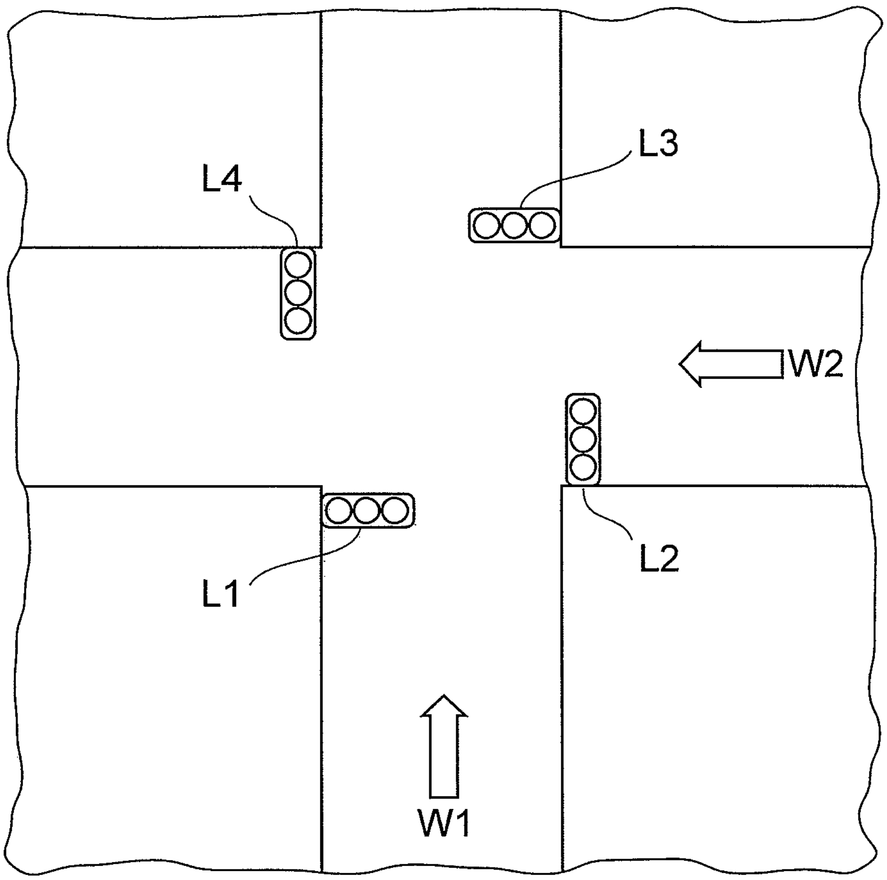
FIG. 7 is a schematic plan view illustrating a crossroad intersection at which four traffic signals are arranged.
Figure 8:
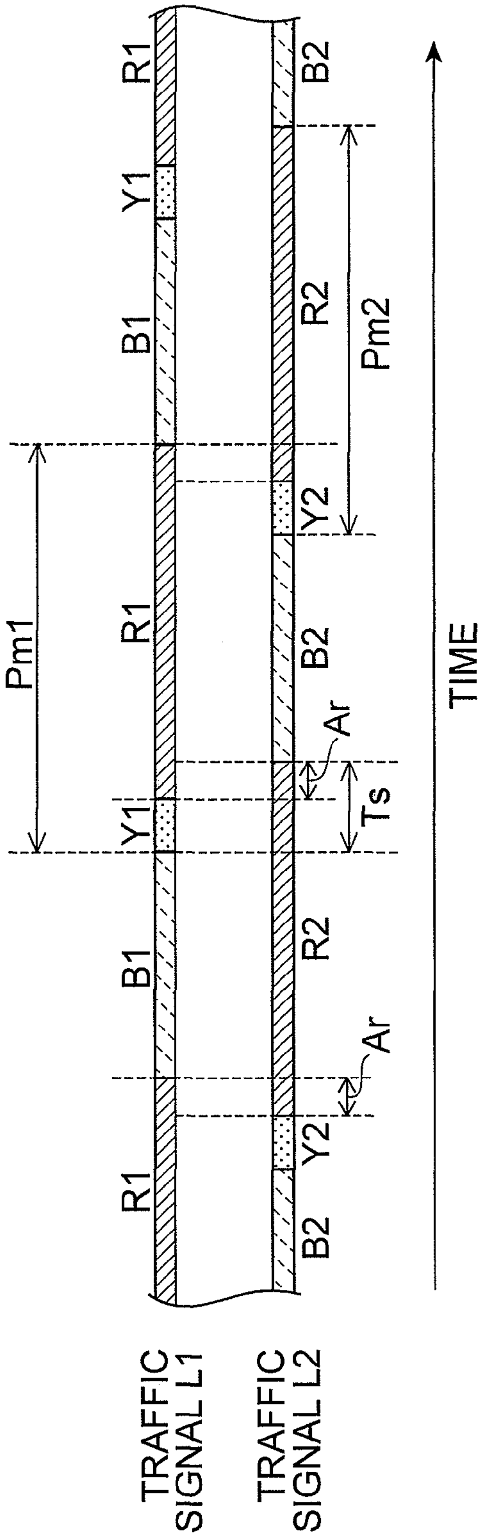
FIG. 8 is a diagram illustrating an interlocking relationship of traffic signals of FIG. 7.

In FIG. 7, W1 indicates an entrance direction in which a vehicle enters the crossroad intersection. W2 indicates an entrance direction that crosses the entrance direction W1. In this case, a traffic signal L1 that corresponds to the entrance direction W1 and a traffic signal L2 that corresponds to the entrance direction W2 have an interlocking relationship according to a predetermined rule. FIG. 8 shows the interlocking relationship between the traffic signal L1 and the traffic signal L2.

In FIG. 8, the green signal time of the traffic signal L1 is denoted by B1, the red signal time is denoted by R1, and the yellow signal time is denoted by Y1. In the same manner, the green signal time of the traffic signal L2 is denoted by B2, the red signal time is denoted by R2, and the yellow signal time is denoted by Y2. Further, Ar illustrated in FIG. 8 denotes all red signal time when both the traffic signal L1 and the traffic signal L2 appear red signals. Ts illustrated in FIG. 8 denotes a lost time. The lost time Ts corresponds to the sum of the all red signal time Ar and the yellow signal time Y1. The lost time, for example, is a predetermined time within the range of 5 to 7 seconds.

Further, Pm1 illustrated in FIG. 8 denotes the maximum signal delay time for the traffic signal L1. Pm2 denotes the maximum delay time for the traffic signal L2.

Following equations (1) and (2) are derived from the interlocking relationship illustrated in FIG. 8.

[Equation 1]

$$B1=Pm2-Ts \quad (1)$$

$$B2=Pm1-Ts \quad (2)$$

The traffic signal cycle estimation unit 8 performs the green signal time estimation process of estimating the green signal time B1 of the traffic signal L1 and the green signal time B2 of the traffic signal L2 on the bases of the above-described equations (1) and (2). Further, considering that the cycle times of the traffic signal L11 and the traffic signal L2 installed at the same intersection are the same, the traffic signal cycle estimation unit 8 performs the cycle time estimation process of estimating the cycle time Cy of the traffic signal L1 and the traffic signal L2 on the basis of the following equation (3).

[Equation 2]

$$Cy=B1+P1 \quad (3)$$

Then, the effects of the traffic signal cycle estimation system 1 and the traffic signal cycle estimation method as described above will be described.

According to the traffic signal cycle estimation system 1 and the traffic signal cycle estimation method related to this embodiment, since the vehicle estimates the cycle information of the traffic signal on the basis of the difference between the free flow travel time F of the first travel time group Ga in which the vehicle does not stop at the traffic signal and the traffic signal stop travel time K of the second travel time group Gb in which the vehicle stops at the traffic signal, estimation of the cycle information can be realized from the traffic signal section travel time which is obtained through analysis of the travel time that is generally collected from the vehicle. Accordingly, according to this traffic signal cycle estimation system 1, necessary data can be easily collected in comparison to the use of a vehicle for collecting special data in order to estimate the cycle information of the traffic signal, and thus the cycle information of the traffic signal can be efficiently estimated.

According to the traffic signal cycle estimation system 1 and the traffic signal cycle estimation method related to the invention, it is considered that the sum of the red signal time of the traffic signal and a predetermined yellow signal time appears in the difference between the free flow travel time F of the first travel time group Ga and the traffic signal stop travel time K of the second travel time group Gb, and the red signal time of the traffic signal can be estimated on the basis of the free flow travel time F of the first travel time group Ga and the traffic signal stop travel time K of the second travel time group Gb.

According to the traffic signal cycle estimation system 1 and the traffic signal cycle estimation method related to the invention, it is considered that the sum of the red signal time of the traffic signal and a predetermined yellow signal time appears most readily in the difference between the peak value of the first travel time group Ga and the peak value of the second travel time group Gb, and by adopting such peak values as the free flow travel time F and the traffic signal stop travel time K, the estimation of the red signal time having high reliability can be realized.

According to the traffic signal cycle estimation system 1 and the traffic signal cycle estimation method related to the invention, the plural traffic signals that are installed at the same intersection interlock with one another on the basis of a predetermined rule, and the green signal times of the respective traffic signals can be estimated on the basis of the red signal times that are estimated with respect to the traffic signals. Further, the cycle time of the traffic signal can be estimated on the basis of the green signal time, the yellow signal time, and the red signal time of the traffic signal.

According to the traffic signal cycle estimation system 1 and the traffic signal cycle estimation method related to the invention, the cycle information of the traffic signal, such as the green signal time, the yellow signal time, the red signal time, and the cycle time, can be efficiently estimated. Since such estimation can contribute to the improvement of the accuracy of the target destination expectation and the improvement of the congestion prediction performance in the car navigation system.

The present invention is not limited to the above-described embodiments.

For example, the free flow travel time F or the traffic signal stop travel time K needs not necessarily be the peak value, but the average value of the traffic signal section travel time or any other value selected on other appropriate conditions may be used. Further, it is not inevitably necessary to use the maximum signal delay time Pm in estimating the cycle information of the traffic signal, but the estimation of the cycle information of the traffic signal may be performed using the average value of the frequency distribution of the signal delay time P illustrated in FIG. 5.

The estimation of the green signal time or the cycle time is not limited to the traffic signal at the crossroad intersection, but may be performed with respect to traffic signals at various intersections. Further, in estimating the green signal time or the cycle time, it is not inevitably necessary to use the interlocking relationship of the traffic signals at the intersection, but the estimation may be performed using parameters of the traffic signals acquired by other methods.

INDUSTRIAL APPLICABILITY

The present invention can be used in the traffic signal cycle estimation device that performs estimation of cycle information of traffic signals.

REFERENCE SIGNS LIST

1: traffic signal cycle estimation system
2: traffic signal cycle estimation device
3: communication unit
4: travel time acquisition unit
5: frequency distribution calculation unit
6: travel time group determination unit
7: signal delay time calculation unit
8: traffic signal cycle estimation unit
10: vehicle
11: in-vehicle device
12: communication unit
13: car navigation system
F: first peak value
Ga: first travel time group
Gb: second travel time group
K: second peak value
P: signal delay time
Pm: maximum signal delay time
Ts: lost time

The invention claimed is:

1. A traffic signal cycle estimation device comprising:

an electronic control unit, including executable program logic, configured to perform:

acquiring travel time data of plural vehicles, wherein said travel time data is generated by the plural vehicles and transmitted from the plural vehicles to the electronic unit;

analyzing the travel time data to acquire a traffic signal section travel time that is a time taken from entrance of the plural vehicles into a predetermined traffic signal section that corresponds to a traffic signal until the plural vehicles pass through the traffic signal section;

calculating a frequency distribution of the traffic signal section travel times;

determining a first travel time group in which the vehicle does not stop at the traffic signal and a second travel time group in which the vehicle stops at the traffic signal on the basis of the frequency distribution of the traffic signal section travel times; and estimating cycle information of the traffic signal on the basis of a difference between the first travel time group and the second travel time group.

2. The traffic signal cycle estimation device according to claim 1, wherein the electronic control unit is configured to estimate a red signal time of the traffic signal on the basis of the difference between the first travel time group and the second travel time group.

3. The traffic signal cycle estimation device according to claim 2, wherein the electronic control unit is configured to estimate the red signal time of the traffic signal on the basis of a difference between a peak value of the first travel time group and a peak value of the second travel time group.

4. The traffic signal cycle estimation device according to claim 2, wherein the electronic control unit is configured to estimate green signal times of plural traffic signals that are installed on the same intersection on the basis of the red signal times that are respectively estimated with respect to the plural traffic signals.

5. A traffic signal cycle estimation method comprising:

acquiring travel time data of plural vehicles from the plural vehicles, wherein said travel time data is generated by the plural vehicles;

analyzing the travel time data to acquire a traffic signal section travel time that is a time taken from entrance of the plural vehicles into a predetermined traffic signal section that corresponds to a traffic signal until the vehicle passes through the traffic signal section;

calculating, by a processor, a frequency distribution of the traffic signal section travel times acquired in the travel time acquisition;

determining a first travel time group in which the vehicle does not stop at the traffic signal and a second travel time group in which the vehicle stops at the traffic signal on the basis of the frequency distribution of the traffic signal section travel times calculated in the frequency distribution calculation; and estimating cycle information of the traffic signal on the basis of a difference between the first travel time group and the second travel time group.

6. The traffic signal cycle estimation method according to claim 5, wherein the traffic signal cycle estimation estimates a red signal time of the traffic signal on the basis of the difference between the first travel time group and the second travel time group.

7. The traffic signal cycle estimation method according to claim 6, wherein the traffic signal cycle estimation estimates the red signal time of the traffic signal on the basis of a difference between a peak value of the first travel time group and a peak value of the second travel time group.

8. The traffic signal cycle estimation method according to claim 6, wherein the traffic signal cycle estimation estimates green signal times of plural traffic signals that are installed on the same intersection on the basis of red signal times that are respectively estimated with respect to the plural traffic signals.

* * * * *